United States Patent [19]

Ballinger

[11] 4,344,159

[45] Aug. 10, 1982

[54] ULTRASONIC TRANSDUCER

[75] Inventor: Dale O. Ballinger, Denver, Colo.

[73] Assignee: Honeywell Inc., Minneapolis, Minn.

[21] Appl. No.: 261,998

[22] Filed: May 8, 1981

[51] Int. Cl.³ ............................................ G01S 15/02
[52] U.S. Cl. ...................................... 367/87; 73/625;
  310/336; 128/660; 367/164; 367/903
[58] Field of Search ................... 367/7, 87, 103, 104,
  367/164, 903, 910; 310/319, 336, 366, 368;
  73/625, 629, 632, 633, 641; 128/660

[56] References Cited

U.S. PATENT DOCUMENTS 3,090,030 5/1963 Schuck ........................... 367/164 X
4,012,952 3/1977 Dory ............................... 367/903 X

*Primary Examiner*—Richard A. Farley
*Attorney, Agent, or Firm*—Lockwood D. Burton

[57] ABSTRACT

An ultrasonic signal transducer is characterized in that the piezoelectrically active element has a first unitary electrode over the entire surface of one face and a matrix of a plurality of individual electrodes on the opposite face. In the receive mode, such an arrangement effectively constitutes a plurality of individual transducers arranged in the matrix array while maintaining the efficacy of a unitary structure. The signals from the individual electrodes are individually amplified, full-wave rectified, and combined additively to produce a composite signal which eliminates the phase cancellation of the ultrasonic pulses distributed over the face of the transducer assembly.

5 Claims, 4 Drawing Figures

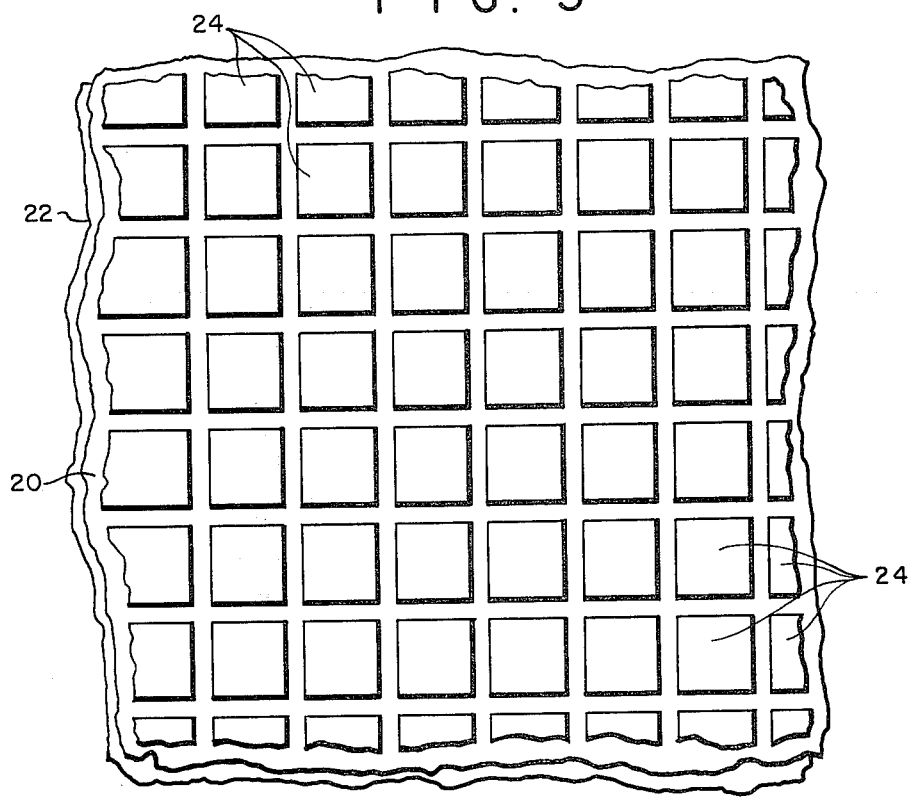
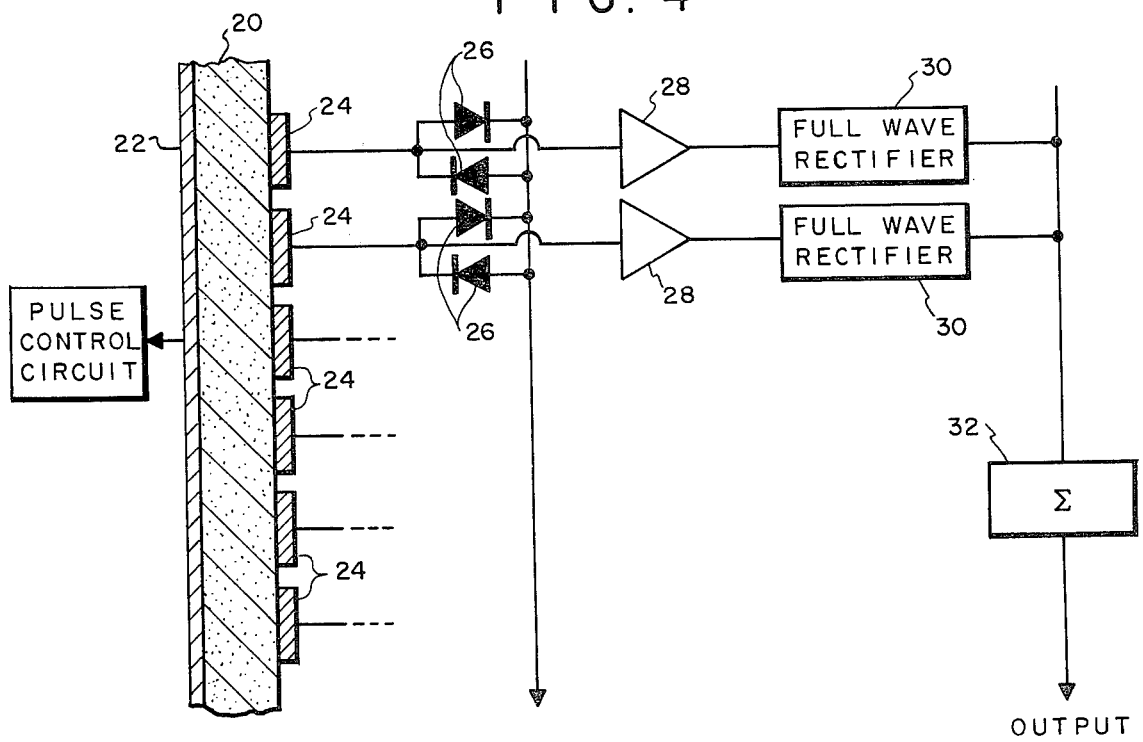

ULTRASONIC TRANSDUCER

BACKGROUND OF THE INVENTION

The present invention relates to ultrasonic imaging. More particularly, it relates to an improved ultrasonic transducer for use in ultrasonic imaging systems.

In the art relating to ultrasonic imaging, especially in the field of medical diagnostics through ultrasonic imaging, there have been provided, both hand-held and mechanically supported transducer assemblies. These assemblies are held in juxtaposition with the body of the individual undergoing examination. Included in such transducer assemblies, in a piezoelectric ultrasonic transducer which alternately transmits ultrasonic pulses into the body under examination and receives reflected pulse energy from tissue interfaces within that body. These reflected pulses are translated into electrical signals. The electrical signals may then be converted into a graphic representation of the tissue interfaces from which the reflected pulses were received, thus constituting a non-invasive examination or diagnostic tool. In such transducer assemblies, especially the hand held variety, the transducer per se has heretofore been in the form of a single unitary transducer. In one known example of such apparatus, the transducer itself has been approximately one-half inch across a major face thereof. It has been found that such dimension is quite large relative to the wave length of the ultrasonic pulses transmitted and received by the transducer. Accordingly, reflective ultrasonic pulses received by the transducer at one part of the transducer may be totally out of phase with the impulse received from the same spot on the target at another part of the same transducer. This, in turn, results in the signals received at one part of the transducer neutralizing or summing to zero with signals received at other parts of the transducer. The obvious result of such neutralization is a reduced signal strength of the detected reflections.

SUMMARY OF THE INVENTION

It is, accordingly, an object of the present invention to provide an improved ultrasonic transducer means.

It is another object of the present invention to provide an ultrasonic transducer having improved signal response characteristic.

In accomplishing these and other objects, there has been provided, in accordance with the present invention, an ultrasonic signal transducer characterized in that the piezoelectricly active element has a first unitary electrode over the entire surface of one face and a matrix of a plurality of individual electrodes on the opposite face. In the receive mode, such an arrangement effectively constitutes a plurality of individual transducers arranged in the matrix array while maintaning the efficacy of a unitary structure. The signals from the individual electrodes are individually amplified, full-wave rectified, and combined additively to produce a composite signal which eliminates the phase cancellation of the ultrasonic pulses distributed over the face of the transducer assembly.

BRIEF DESCRIPTION OF THE DRAWINGS

A better understanding of the present invention may be had from the following detailed description when read in the light of the accompanying drawings, in which:

FIG. 3 is an enlarged fragmentary view of a transducer matrix constructed in accordance with the present invention; and FIG. 4 is a schematic representation of the transducer constructed in accordance with the present invention.

DETAILED DESCRIPTION

Figure 1:
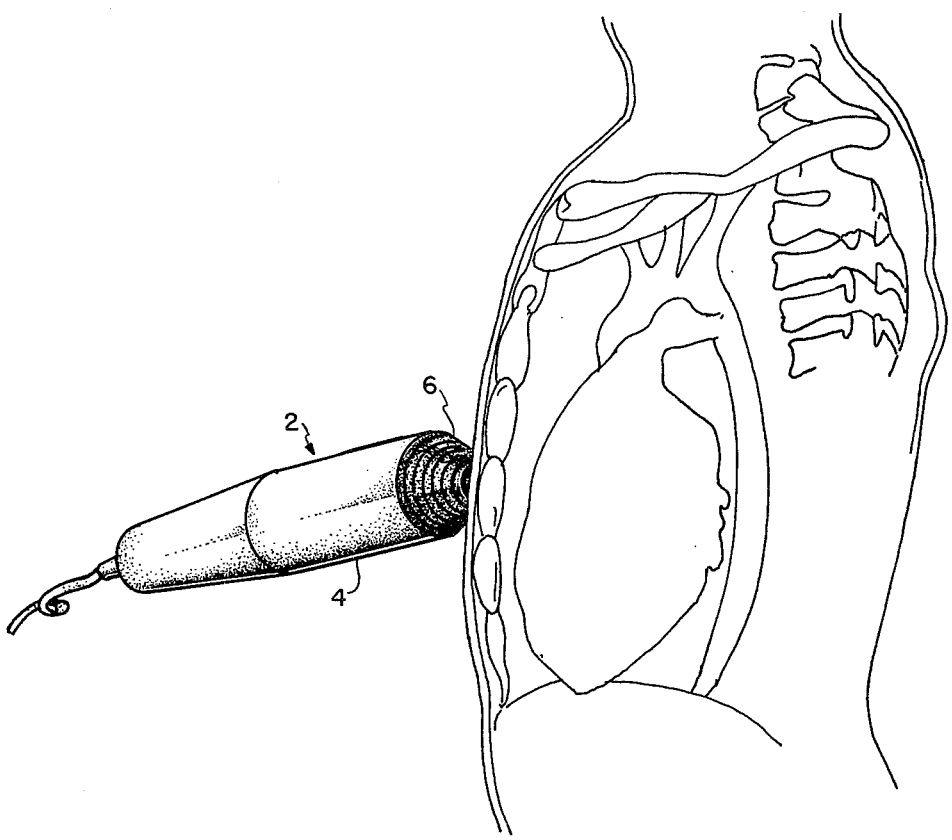
FIG. 1 is a pictorial representation of a hand held ultrasonic transducer assembly.

Referring now to the drawings in more detail, there is shown in FIG. 1 a representation of a hand held ultrasonic transducer structure 2. The structure 2 includes a main body portion 4 which terminates in an operating end 6 in the form of a truncated cone. At the opposite end of the body portion 4 from the operating end 6 there is an interconnecting cable structure whereby the transducer structure is electrically connected to suitable driving and analyzing apparatus. As shown in FIG. 1, when the transducer structure 2 is used as means for accomplishing non-invasive examination of internal tissue of a human body, the operating end 6 is positioned against that body 8 and arranged to occupy a field of view between adjacent ribs 10 toward internal tissue interfaces.

Figure 2:
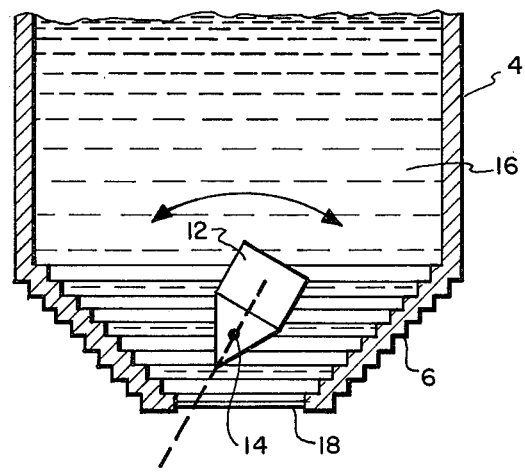
FIG. 2 is a cross-sectional view of a portion of the operating end of the transducer assembly shown in FIG. 1.

In FIG. 2 there is shown, in a cross-sectional view, a representation of certain features of a preferred embodiment of an ultrasonic transducer structure constructed in accordance with the present invention. The body portion 4 of the transducer structure 2 houses a suitable transducer assembly 12 which is arranged to be mechanically oscillated through a predetermined angle about a pivot point 14. The driving mechanism for effecting oscillation of the transducer assembly 12 is not a part of the present invention and is, accordingly, not illustrated herein. The interior of the body portion 4 is filled with a suitable inert coupling fluid 16. The operating end 6 of the transducer structure body portion 4 is provided with an acoustically transparent window 18. The window 18 also serves to seal the operating end of the transducer head structure 2 in order to retain the fluid fill 16.

Various features of a preferred embodiment of an ultrasonic system into which the structure of the present invention may be incorporated are shown in the following copending patent applications:

Ballinger Ser. No. 173,859 filed July 30, 1980, now U.S. Pat. No. 4,300,217, relates to a Transducer Head Structure.

Gessert Ser. No. 173,874 filed July 30, 1980 relates to a Real Time Fill Circuit.

Evert Ser. No. 224,897 filed Jan. 14, 1981, now U.S. Pat. No. 4,316,271, relates to a Fluid Fill Purge Arrangement.

Evert Ser. No. 224,899 filed Jan. 14, 1981 relates to an Angular Position Sensor and Helmstetter Ser. No. 242,967 filed Mar. 12, 1981 relates to a Signal Conditioning Circuit.

While the aforementioned copending applications all relate to various features of an ultrasonic imaging system those features are not essential to the present invention. The disclosures in those applications might be helpful, however, in understanding the environment of present invention.

As hereinbefore noted, included in the transducer assembly 12 is an ultrasonic transducer per se. In conventional arrangements used heretofore, the transducer per se has been, for example, on the order of a half inch across a major face thereof. That dimension is relatively large compared to the wavelength of the ultrasonic pulses transmitted and received by the transducer. As such, echo pulse signals received by different parts of the transducer from the same point in the body under examination will impinge upon the transducer in phase opposition relationship. That phase opposition relationship produces a neutralizing effect, or summing to zero, of the effective signals. This is especially observed in the case of the piezoelectric element having a single electrode on and substantially covering each of the two major opposite faces, since those electrodes can only sense the net effect distributed across the face of the piezoelectric element.

In accordance with the present invention, and as shown in FIGS. 3 and 4, that difficulty is overcome by dividing the electrode on one face of the piezoelectric element into a matrix of a plurality of electrically independent electrodes distributed over the one major face of the piezoelectric element. Thus, as shown in FIGS. 3 and 4, a piezoelectric transducer element 20 has a unitary electrode 22 which extends over one major face of the piezoelectric element and is connected to an input pulse control circuit 23. On the opposite face of the piezoelectric element 20 from the unitary electrode 22 there is a two-dimensional matrix of a plurality of the aforementioned electrically independent electrode elements 24. Each of the electrode elements 24 is connected to a diode limiter 26, thence to ground. The elements 24 are also each connected to the input of a corresponding amplifier 28. The output of each of the amplifiers 28 is connected to a associated full-wave rectifier 30. The output of each of the full-wave rectifiers 30 is fed in common to the input of a summing circuit 32. The output of the summing circuit is, in turn, applied to the conventional signal conditioning circuitry for an imaging transducer system. While no specific number of independent electrodes appear to be critical, a 6×6 matrix has been found to be satisfactory.

In the transmit mode, the common electrode 22 may be pulsed by the input pulse control circuit 23 to generate the series of ultrasonic pulses for transmission into the body under study. In the transmit mode, the electrically independent electrodes 24 are effectively grounded through the diode limiting circuits 26. In the received mode, the echo ultrasonic signals returned to the transducer impinge on certain parts of the transducer surface with a portion of the returned wave in phase opposition to the signals received on other portions of the transducer. With the electrically independent electrodes 24 actively detecting the signals, each of the electrodes 24 will respond to the pulse energy impressed on the transducer in the immediate vicinity defined by the individual electrode itself. Thus, the transducer responds to the ultrasonic wave as though the transducer was in fact a plurality of independent transducers. Thus, a negative pressure signal at one particular location on the surface of the transducer will be detected by the immediately adjacent independent electrode 24 while a positive pressure signal applied to the transducer at a different location thereon would be detected by the independent electrode 24 in that vicinity.

The signals detected by the electrodes 24 are very low level signals. Accordingly, those signals are amplified by the respective amplifiers 28 to a level suitable for transmission to the full-wave rectifiers 30. When the signals from the individual electrodes 24 have been full-wave rectified by their associated rectifiers 30, the resultant signals will all be unidirectional. In this manner, all of the resulting pulse signals may be applied to the summing circuit 32 to be combined additively to produce a much higher level signal. Such higher level signal may then be applied to the conventional signal conditioning circuitry necessary to produce the desired imaging of the body under examination. In this manner, the neutralizing effect of ultrasonic pulses arriving at different parts of the transducer out of phase with each other has been eliminated.

Thus, there has been provided, in accordance with the present invention, an improved ultrasonic transducer system including a phase insensitive ultrasonic transducer.

The embodiments of the invention in which an exclusive property or privilege is claimed are defined as follows:

1. A phae insensitive ultrasonic transducer assembly comprising:
   a piezoelectric transducer element having a unitary electrode on one major face thereof and a plurality of electrically independent electrodes on an opposite major face of said transducer element;
   input pulse control means connected to said unitary electrode to excite said piezoelectric transducer element to produce a series of ultrasonic pulses for transmission into an object for study, said piezoelectric transducer element being responsive to echo pulses from within said object in accordance with discontinuities within said object;
   signal responsive means connected, respectively, to each of said electrically independent electrodes to detect echo signals produced in said piezoelectric transducer element in response to said echo pulses, said signal responsive means each including full-wave rectifying means to convert said echo signals to unidirectional signals; and
   means for additively combining said unidirectional signals.

2. An ultrasonic transducer assembly as set forth in claim 1 wherein said signal responsive means each includes an amplifier means connected between respective ones of said electrically independent electrodes and corresponding ones of said full-wave rectifying means.

3. An ultrasonic transducer assembly as set forth in claim 2 wherein said means for additively combining includes a summing circuit.

4. An ultrasonic transducer assembly as set forth in claim 2 wherein said signal responsive means each includes a signal limiter connected between said electrically independent electrodes and said amplifier means.

5. An ultrasonic transducer assembly as set forth in claim 4 wherein said plurality of electrically independent electrodes are arranged in a two dimensional matrix.

* * * * *